Aug. 11, 1964
J. D. HAWKINS
3,143,920
MOTION PICTURE VIEWER
Filed April 7, 1958
2 Sheets-Sheet 1
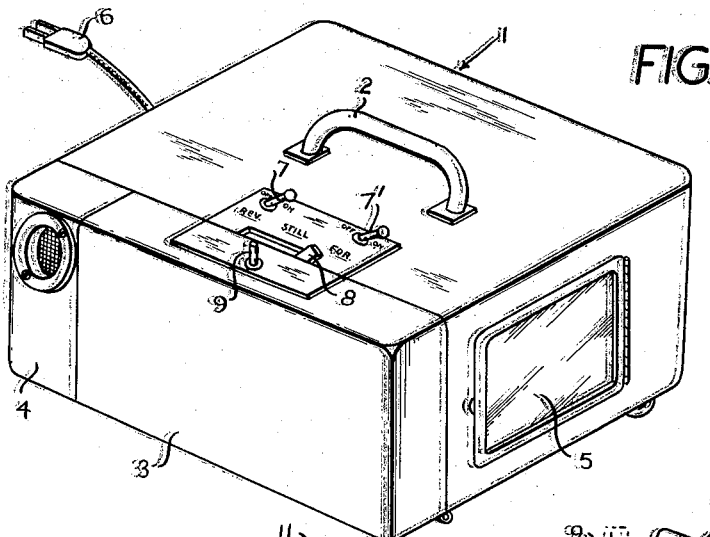
FIG. 1.
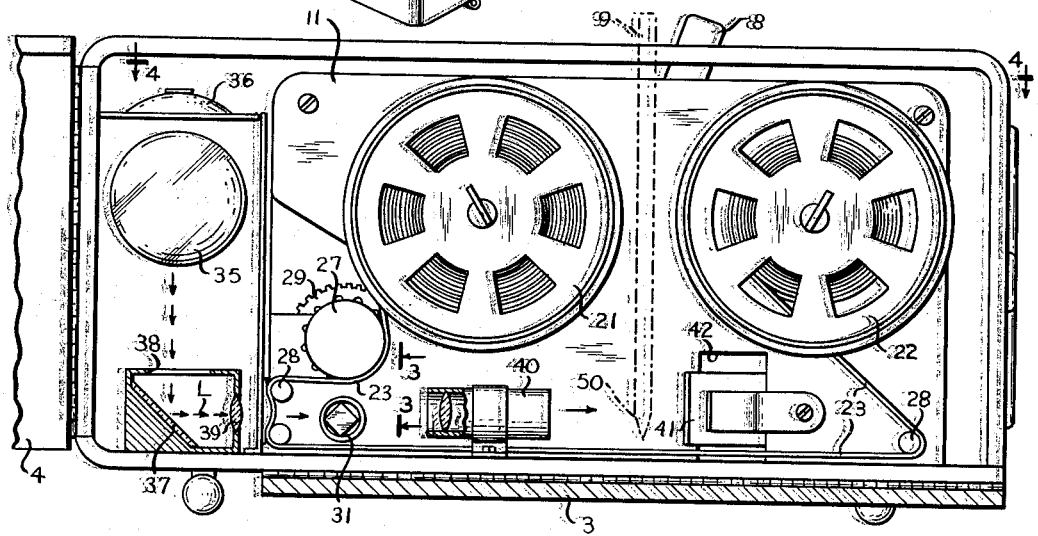
FIG. 2.
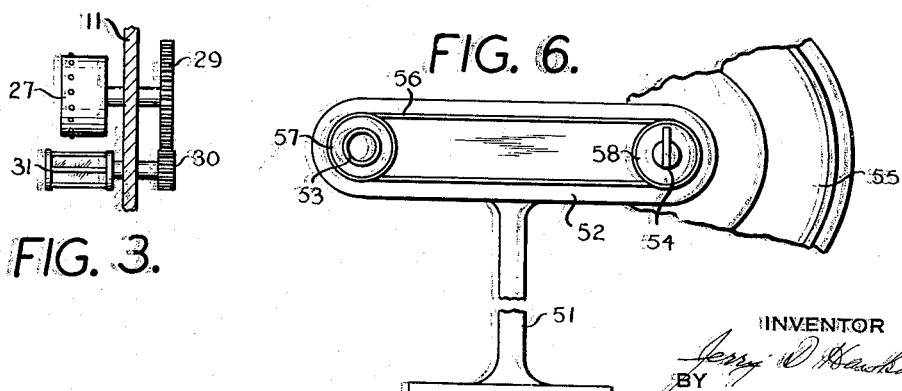
FIG. 3.
FIG. 6.
INVENTOR
Jerry D. Hawkins
BY
ATTORNEY Aug. 11, 1964

J. D. HAWKINS 3,143,920

MOTION PICTURE VIEWER

Filed April 7, 1958

INVENTOR
Jerry D. Hawkins
BY
James J. Henney
ATTORNEY

3,143,920
MOTION PICTURE VIEWER
Jerry D. Hawkins, 16 Lake Shore Drive, Massapequa, N.Y.
Filed Apr. 7, 1958, Ser. No. 726,952
11 Claims. (Cl. 88—24)

This invention relates to film viewers. More particularly, the invention is concerned with a portable viewer having provision for projecting film on a self-contained screen by projection from the rear of the screen.

A large variety of viewing and editing devices are available in both stills and motion picture frame film, but in the latter case these either do not provide for projection of the moving film or merely are projector units utilized with an external screen and such devices are not, accordingly, suitable for portable use for a viewing of motion pictures.

The general object of the invention is to provide a viewer for the indicated purposes and one which is readily portable and useable in vehicles and other locations where readily useable projection surfaces would not be available.

A viewer embodying the invention in a preferred form will now be described in connection with the accompanying drawing, and the features forming the invention will then be pointed out in the appended claims.

In the drawing:

FIG. 1 is an isometric of the viewer of the invention;

FIG. 2 is a side elevation with cover opened up;

FIG. 3 is a fragmentary view looking in the direction of the arrows 3—3 of FIG. 2;

FIG. 6 is an elevation view of an attachment used with the device of FIGS. 1–5.

Figure 4:
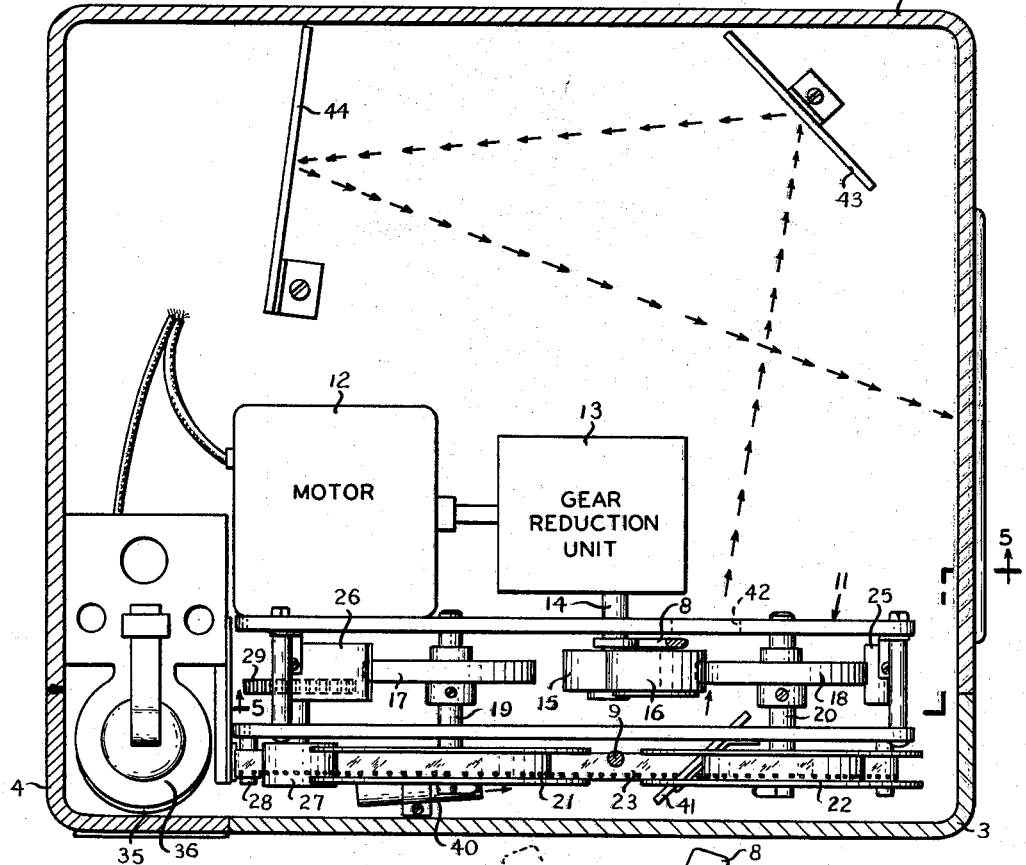
FIG. 4 is a section on the line 4—4 of FIG. 2.

Referring now to FIG. 1, the device comprises a case 1 and carrying handle 2 and equipped with hinged or removable side wall sections 3, 4 for furnishing acccess to the interior mechanism as later described. A viewing screen 5 is carried in an opening in the front wall of the case and an electric connection plug 6 of usual type is provided. On and off switch 7, 7' forward and reverse lever 8 and editing button 9 complete the exterior elements.

Figure 5:
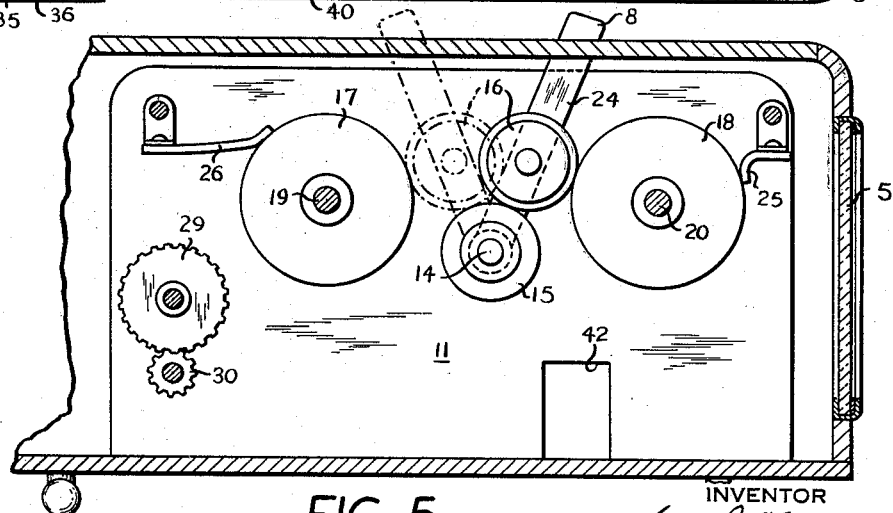
FIG. 5 is a section on the line 5—5 of FIG. 4.

Internally the structure comprises a frame work 11 supporting the reels and the driving mechanism and also a shutter mechanism, together with an optical system as later described. A motor 12 and gear reduction unit 13 power the mechanism, driving through a shaft 14, a friction wheel 15 which, in turn, through an intermediate friction wheel 16 drives either of two friction wheels 17, 18 carried on shafts 19, 20 which are journaled in the frame 11 and fitted with suitable means for detachably holding the reels 21, 22, which typically carry 8 mm. film 23 of usual type. The wheel 16 is mounted on an arm 24 pivotally carried on the shaft 14 and swingable between full line position in FIG. 5 and the dot-dash position of that figure for driving either wheel 18 or wheel 17 so as to run the film either forwards (FOR) or backwards (REV) as desired, setting the arm in centered position (STILL) disengages the drive, for examining a single frame or making still prints. Overrunning of a film is prevented by flexible elements 25 and 26 engaging the wheels 17, 18 so as to furnish a slight resistance to that rotation.

The film passes over a sprocket wheel 27 and around the usual guides 28, adjustable vertically for framing, the sprocket wheel 27 being coupled through gears 29, 30 to the shutter 31, this sprocket and shutter mechanism being of a conventional character.

The light projection system comprises a light bulb 35 (controlled by switch 7'), energized along with motor 12 (controlled by switch 7) through the connection 6, a parabolic reflector 36 and a mirror 37 for projecting a light beam, the central axis of which is indicated by a series of arrows identified by the letter L. Mirror 37 is contained in a casing having an upper opening 38 for cutting off scattered, reflected light and a side opening mounting condensing lens 39. The light beam passes through the shutter 31 and through a lens or lens assembly 40 of usual form to a mirror 41 from which it is reflected through openings 42 in the frame 11 to a mirror 43, thence backwardly to a mirror 44 and from there to the screen 5, where an image suitable for viewing is produced. Assuming a viewing screen 5 of approximately four inches by five inches in dimensions, it will be apparent that the unit as a whole is exceptionally compact, convenient to handle and useable in any desired location. It will also be apparent that the central axis of the light beam L is elevated by a distance of about two inches in passing from mirror 41 to the screen 5, while the length of the beam so straightened out may be about a foot and a half or so. Accordingly, a slight inclination of the mirrors 41, 43 and 44, about 6° to the vertical, will suffice to locate the beam properly on the screen 5. The angular disposition of the mirrors as viewed in plan (FIG. 4) is subject to some variation and rearrangement, but requires essentially a lateral reflection from mirror 41 to mirror 43, a rearward reflection from mirror 43 to mirror 44 and a forward reflection from mirror 44 to the screen 5. No perceptible distortion of the projected image is found to occur.

In use, the cover elements 3, 4 are removed and the film wheels 22, 21 are put in place and the film threaded in the usual manner. Focusing may be accomplished in the usual way by adjusting the lens element 40, the light switch 7 controlling both motor 12 and light 35, and the film drive may be clutched in and controlled by means of the lever 8 in a manner which is believed obvious. If it is desired to mark the film for editing, the button 9 which is at the top of a notching stylus 50 is used, the pushing down of this button causing the stylus to notch the film in the usual way. If it is desired to use a larger size reel than the reel 22, the attachment of FIG. 6 may be employed. This comprises a pedestal 51 carrying a frame 52 in which is rotatably mounted a bushing 53 adapted to be fixed to shaft 20, replacing the reel 22, and a second fitting 54 adapted to carry a larger diameter spool 55. A belt 56 running around the pulleys 57, 58 serves to drive the reel 55 from shaft 20. The pedestal 51 may rest upon a table supporting the device and requires no other support than its attachment to the shaft 20.

Screen 5 is hinged as indicated (or otherwise removable) to permit the making of still prints, or projection on an external screen, involving front projection instead of rear projection. In either case, a simple attachment comprising a mirror at an appropriate spacing and angle (normally about 45°) and a housing fitting the opening for screen 5 may be used, the pivoting frame or the opening for the projected beam being set at a 90° angle to the plane of the wall containing the screen 5, so that the necessary reversal of image is obtained. Alternatively, a second beam path may be provided as by providing an adjustment for mirror 41 into a different angular position (or an insertable substitute mirror) along with a mirror or mirrors cooperating with mirror 41 in that position and involving one less (or more) reflection than in the arrangement shown.

What is claimed is:

1. A portable motion picture viewer comprising a carrying case having a projection screen, in its front wall, reel holding and projecting mechanism adjacent a side wall of the case and projecting a beam along an axis extending substantially parallel to the side wall and adjacent the same, a mirror toward the front of the case and reflecting the said beam across the said case to its opposite side wall, a mirror also toward the front of the case and adjacent the said opposite side wall reflecting the beam rearwardly of the case, and a third mirror toward the rear of the case again reflecting the said beam onto the projection screen.

2. A portable motion picture viewer comprising a carrying case having a projection screen in its front wall, an internal frame structure extending substantially from rear wall to front wall of the case adjacent a side wall thereof, reel holding and projecting mechanism supported by the said frame structure and projecting a beam along an axis extending substantially parallel to the side wall and adjacent the same, a mirror toward the front of the case and reflecting the said beam across the said case to its opposite side wall, a mirror also toward the front of the case and adjacent the said opposite side wall reflecting the beam rearwardly of the case, and a third mirror toward the rear of the case again reflecting the said beam onto the projection screen.

3. A portable motion picture viewer comprising a carrying case having a projection screen in its front wall, reel holding and projecting mechanism adjacent a side wall of the case and projecting a beam along an axis extending substantially parallel to the side wall and adjacent the same, a mirror toward the front of the case and reflecting the said beam across the said case to its opposite side wall, a mirror also toward the front of the case and adjacent the said opposite side wall reflecting the beam rearwardly of the case, and a third mirror toward the rear of the case again reflecting the said beam onto the projection screen, the said mirrors being slanted slightly off vertical to center the projected image on the screen.

4. A portable motion picture viewer comprising a carrying case having a projection screen in its front wall, an internal frame structure extending substantially from rear wall to front wall of the case adjacent a side wall thereof, reel holding and projecting mechanism supported by the said frame structure and projecting a beam along an axis extending substantially parallel to the side wall and adjacent the same, the said mechanism comprising reel holding elements on the outer face of the said frame structure, a mirror toward the front of the case and reflecting the said beam across the said case to its opposite side wall, a mirror also toward the front of the case and adjacent the said opposite side wall reflecting the beam rearwardly of the case, and a third mirror toward the rear of the case again reflecting the said beam onto the projection screen, the case having removable side wall elements for exposing the said frame structure to permit placement of reels thereon.

5. A portable motion picture viewer comprising a carrying case having a projection screen in its front wall, reel holding and projecting mechanism adjacent a side wall of the case and projecting a beam along an axis extending substantially parallel to the side wall and adjacent the same, a mirror toward the front of the case and reflecting the said beam across the said case to its opposite side wall, a mirror also toward the front of the case and adjacent the said opposite side wall reflecting the beam rearwardly of the case, a third mirror toward the rear of the case again reflecting the said beam onto the projection screen, the said mirrors being slanted slightly off vertical to center the projected image on the screen, and a film notching element comprising a button extending through the top of the case to mark the film for editing.

6. A portable motion picture viewer comprising a a carrying case having a projection screen in its front wall, an internal frame structure extending substantially from rear wall to front wall of the case adjacent a side wall thereof, reel holding and projecting mechanism supported by the said frame structure and projecting a beam along an axis extending substantially parallel to the side wall and adjacent the same, the said mechanism comprising reel holding elements on the outer face of the said frame structure, a mirror toward the front of the case and reflecting the said beam across the said case to its opposite side wall, a mirror also toward the front of the case and adjacent the said opposite side wall reflecting the beam rearwardly of the case, and a third mirror toward the rear of the case again reflecting the said beam onto the projection screen, the case having removable side wall elements for exposing the said frame structure to permit placement of reels thereon, and a film notching element comprising a button extending through the top of the case to mark the film for editing.

7. A portable motion picture viewer according to claim 6, in which the projecting mechanism comprises a condensing lens and a light source including a mirror and a light bulb positioned remotely from the condensing lens and projecting a beam therethrough by reflection from the last, said mirror.

8. A portable motion picture viewer according to claim 7, comprising also a parabolic reflector cooperating with said light bulb.

9. A portable motion picture viewer comprising a carrying case having a projection screen opening in its front wall, a removable projection screen in the said opening, reel holding and projecting mechanism adjacent a side wall of the case and projecting a beam along an axis extending substantially parallel to the side wall and adjacent the same, a mirror toward the front of the case and reflecting the said beam across the said case to its opposite side wall, a mirror also toward the front of the case and adjacent the said opposite side wall reflecting the beam rearwardly of the case, and a third mirror toward the rear of the case again reflecting the said beam onto the projection screen.

10. A portable motion picture viewer according to claim 9, in which the said screen is hingedly mounted in the said opening.

11. A portable motion picture viewer comprising a carrying case having a projection screen in its front wall, an internal frame structure extending substantially from rear wall to front wall of the case adjacent a side wall thereof, reel holding and projecting mechanism supported by the said frame structure and projecting a beam along a predetermined axis, mirror means reflecting the said beam onto the screen, the said reel holding and projecting mechanism comprising reel, spindles, a friction device for a said spindle, film guide means including a sprocket wheel driven by the film, shutter mechanism and means positively driving the said shutter mechanism from said sprocket wheel.

References Cited in the file of this patent
UNITED STATES PATENTS

| | | |
|---|---|---|
| 1,868,722 | Birdsall | July 26, 1932 |
| 1,936,043 | Thomas | Nov. 21, 1933 |
| 1,942,231 | Whittel | Jan. 2, 1934 |
| 2,275,498 | Berndt | Mar. 10, 1942 |
| 2,449,705 | Jones | Sept. 21, 1948 |
| 2,451,947 | Harvey | Oct. 19, 1948 |
| 2,485,709 | Davock | Oct. 28, 1949 |
| 2,486,849 | Huebner | Nov. 1, 1949 |
| 2,518,209 | Whipple et al. | Aug. 8, 1950 |
| 2,551,482 | Wolk | May 1, 1951 |
| 2,906,167 | Castedello et al. | Sept. 29, 1959 |